United States Patent [19]

Fontaine

[11] Patent Number: 4,572,319
[45] Date of Patent: Feb. 25, 1986

[54] AUTOMATIC VEHICLE BRAKING SYSTEM

[75] Inventor: William G. Fontaine, Pompano Beach, Fla.

[73] Assignee: Fail Safe Brake Corporation, Coral Springs, Fla.

[21] Appl. No.: 657,191

[22] Filed: Oct. 3, 1984

[51] Int. Cl.$^4$ ............................................. B60K 27/08
[52] U.S. Cl. ............................ 180/273; 188/151 R; 188/170; 192/3 R; 303/19; 303/28
[58] Field of Search ............ 180/273; 192/3; 303/19, 303/28; 188/151, 170

[56] References Cited

U.S. PATENT DOCUMENTS

| | | | |
|---|---|---|---|
| 2,907,415 | 10/1959 | Norman | 188/151 |
| 3,402,792 | 9/1968 | Masser | 188/170 |
| 3,487,451 | 12/1969 | Fontaine | 303/19 |
| 3,500,946 | 3/1970 | Boyajian | 180/273 |
| 3,674,321 | 7/1972 | Fontaine | 303/28 |
| 3,790,223 | 2/1974 | Fontaine | 180/273 |
| 4,336,860 | 6/1982 | Noller et al. | 180/273 |
| 4,389,154 | 6/1983 | Minor et al. | 180/273 |

Primary Examiner—Richard A. Bertsch
Attorney, Agent, or Firm—Oltman and Flynn

[57] ABSTRACT

The invention provides a parking brake system for automotive or delivery type vehicles, golf carts, etc. that applies the emergency or parking brake automatically after the engine is turned off or if other pre-determined conditions are met, such as, but not limited to, the driver leaving the seat or hydraulic brake failure.

Several other pre-determined conditions can be integrated into the system to stop or retard the release of the parking brake such as door not properly closed, seat belt not properly in use, etc.

An electronic time delay pack can be incorporated with a seat switch to allow for driver bounce on rough terrain.

A one-way check valve is connected between the intake manifold and the actuator. This check valve opens fully when the engine is running and allows the vacuum to compress the actuator and release the parking brake. The check valve closes when the engine is turned off and the check valve retards the sudden return of atmospheric pressure to the actuator, thus preventing lock-up at speed. After a time delay caused by the check valve and actuator leakage, atmospheric pressure returns to the actuator allowing a safe controlled application of the parking brake.

6 Claims, 8 Drawing Figures

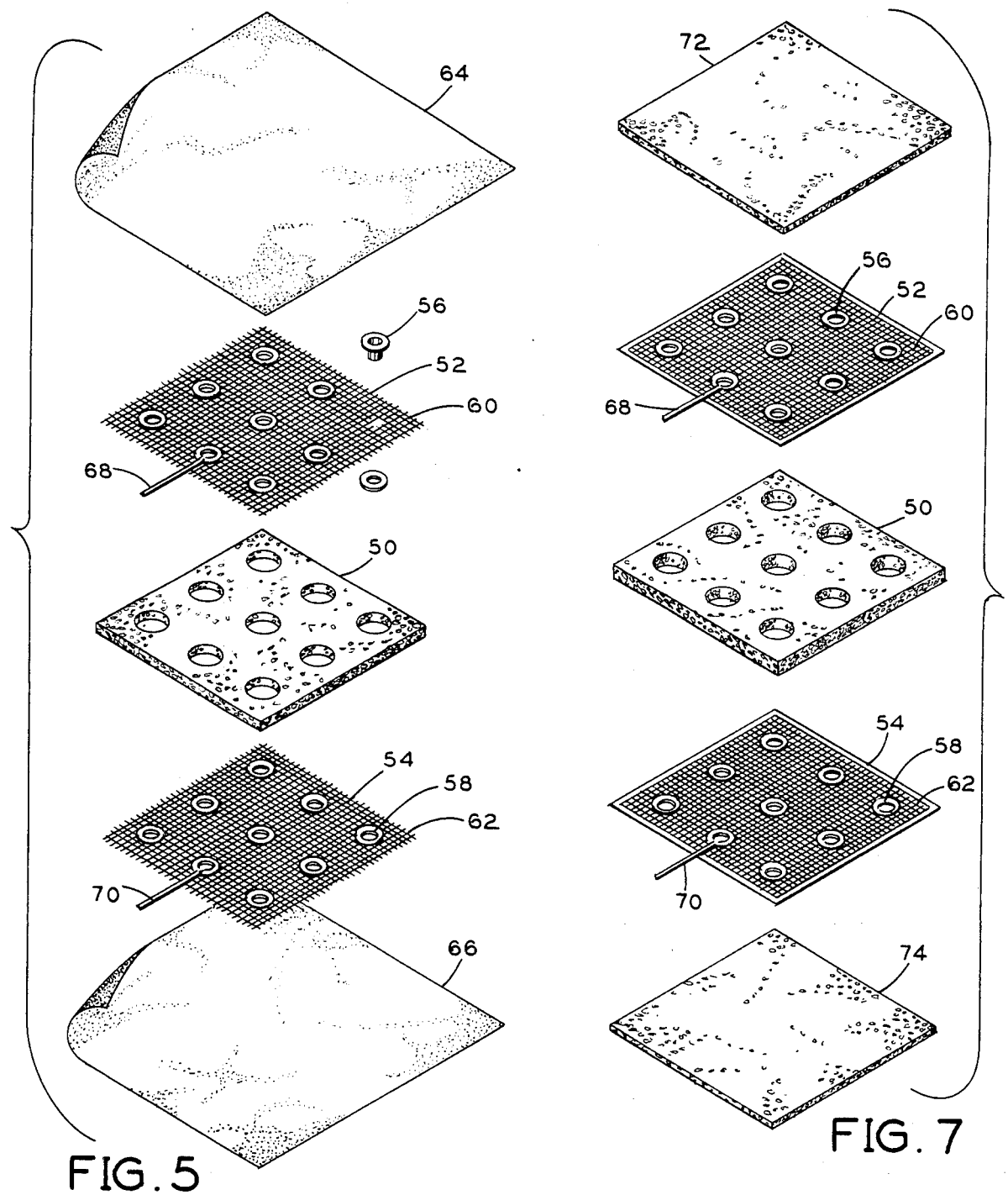
FIG. 5
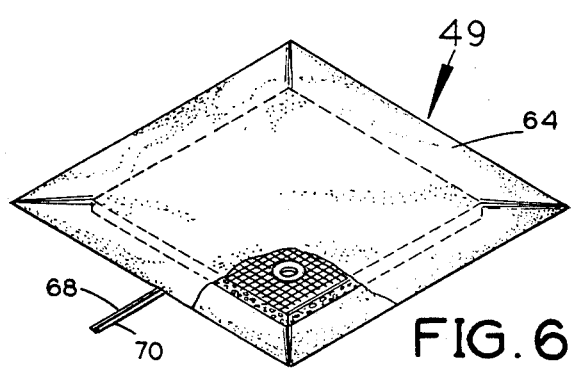
FIG. 6
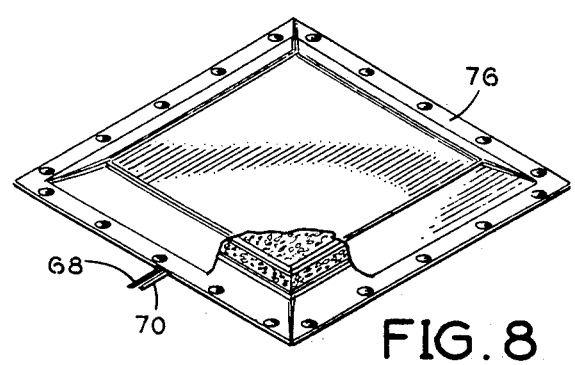
FIG. 7
FIG. 8

AUTOMATIC VEHICLE BRAKING SYSTEM

SUMMARY OF THE INVENTION

This invention relates to a system for automatically applying emergency or parking brakes on a vehicle powered by an internal engine when the engine is turned off. Occasionally, the driver of an automotive vehicle will neglect to apply the parking brakes upon parking the vehicle in a situation where safety requires that the parking brakes be on. For example, if the driver leaves the vehicle parked on an incline, the vehicle may roll downhill and endanger other vehicles or persons. There is a particular need for parking brakes in delivery vehicles such as postal vehicles.

The present invention is directed to a novel and simplified braking system on a vehicle for applying one or more emergency or parking brakes automatically after the vehicle engine is turned off. The present system senses the pressure in the engine intake manifold, keeping these brakes released while the engine is running and applying these brakes when the engine stops running. Preferably, the system delays the application of these brakes for a suitable short time interval after the engine stops so that they would not be applied if the vehicle engine stalls momentarily and is promptly restarted by the driver.

In accordance with this invention, the braking system has a fluid pressure-operated actuator for controlling one or more emergency or parking brakes, preferably on the rear wheels of the vehicle. A one-way check valve connects this brake actuator to the vehicle engine intake manifold. When the engine is running, this check valve is fully open and the substantial partial vacuum in the engine intake manifold is applied to the brake actuator to hold the brakes released. When the engine goes off, the check valve closes automatically but with enough leakage through it that after a short time delay, e.g. 1 to 5 seconds, the substantially atmospheric pressure in the engine intake manifold will be applied to the brake actuator to cause it to apply the emergency or parking brakes.

A more elaborate system, in accordance with another embodiment of the invention, also has a seat switch arranged to control the brake actuator such that the brakes will be applied automatically after the driver leaves the driver's seat with the engine still running. This more elaborate system has a three-way solenoid valve connected between the brake actuator and the check valve, and a time delay circuit connected between the seat switch and the solenoid valve. The seat switch responds to the driver's leaving the driver's seat and after a short delay, e.g. 2 or 3 seconds, determined by the time delay circuit, it causes the solenoid valve to apply atmospheric pressure to the brake actuator, thereby applying the emergency or parking brakes.

A principal object of this invention is to provide a novel and simplified arrangement for applying one or more emergency or parking brakes on an automotive vehicle after the vehicle engine is turned off.

Another object of this invention is to provide such a braking arrangement which also will apply such a brake or brakes automatically when the driver leaves the driver's seat, particularly if the engine is still running.

Other objects of this invention will appear from the following description and appended claims, reference being had to the accompanying drawings forming a part of this specification wherein like reference characters designate corresponding parts in the several views.

DESCRIPTION OF THE DRAWINGS

FIG. 5 is an exploded view showing the parts of a seat switch included in either or both of the systems of FIGS. 1 and 4;

FIG. 6 is a perspective view of the assembled switch of FIG. 5;

FIG. 7 is an exploded view showing the internal parts of another form of seat switch for the systems of FIGS. 1 and 4; and FIG. 8 is a perspective view of the assembled switch of FIG. 7.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION

The invention provides a parking brake system for automotive or delivery type vehicles, golf carts, etc. that applies the emergency or parking brake automatically after the engine is turned off or if other pre-determined conditions are met, such as, but not limited to, the driver leaving the seat or hydraulic brake failure.

Several other pre-determined conditions can be integrated into the system to stop or retard the release of the parking brake such as door not properly closed, seat belt not properly in use, etc.

An electronic time delay pack can be incorporated with a seat switch to allow for driver bounce on rough terrain.

A one-way check valve is connected between the intake manifold and the actuator. This check valve opens fully when the engine is running and allows the vacuum to compress the actuator and release the parking brake. The check valve closes when the engine is turned off and the check valve retards the sudden return of atmospheric pressure to the actuator, thus preventing lock-up at speed. After a time delay caused by the check valve and actuator leakage, atmospheric pressure returns to the actuator allowing a safe controlled application of the parking brake.

Figure 1:
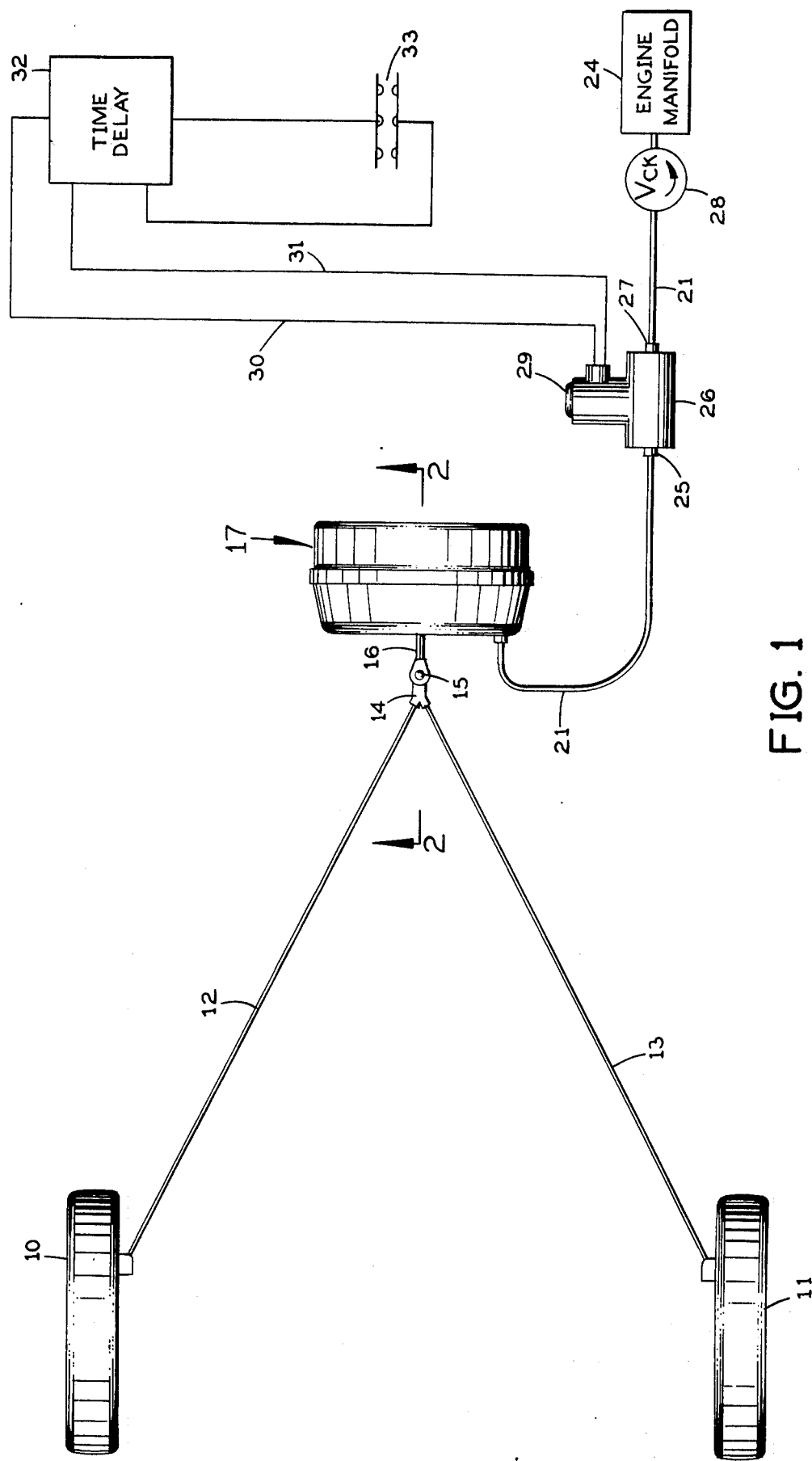
FIG. 1 is a schematic diagram of a vehicle emergency braking system in accordance with a first embodiment of this invention.

Referring to FIG. 1, the present braking system is shown as embodying emergency or parking brakes on both rear wheels 10 and 11 of an automotive vehicle powered by an internal combustion engine (not shown) having the usual engine intake manifold 24 which is under a substantial partial vacuum when the engine is running and is at substantially atmospheric pressure when the engine is off.

The present system has flexible cables 12 and 13 which are pulled forward to apply these brakes and relaxed to release the brakes. The front ends of both cables are anchored in a fitting 14 which is pivotally connected at 15 to the rearwardly extending piston rod 16 of a cylinder-and-piston unit 17, which is the brake actuator in the present invention. Preferably, this fitting is designed to be readily disconnected deliberately from the piston rod in case of a malfunction of the present brake system or in case it becomes necessary to tow the vehicle.

Figure 2:
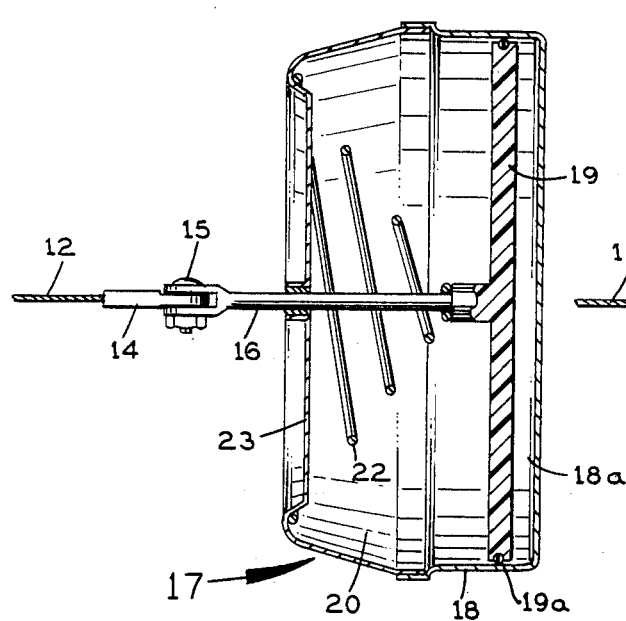
FIG. 2 is a section taken along the line 2—2 in FIG. 1 through the brake actuator in this system, showing its brake-applying position.

This actuator has a cylinder 18 (FIGS. 2 and 3) in which a piston 19 is slidably mounted. An O-ring 19a on the periphery of the piston sealingly engages the inside of the cylinder in air-tight fashion. To the right of the piston in FIGS. 2 and 3 the interior of the cylinder presents a variable-volume chamber 18a which is connected to the atmosphere. To the left of this piston the interior of the cylinder defines a variable volume chamber 20 which is connected to a conduit 21 (FIG. 1). A spiral spring 22 (FIG. 2) is under compression between piston 19 and the left end wall 23 of the cylinder. This spring biases the piston to the right and positions it as shown in FIG. 2 when the cylinder chamber 20 between the piston 19 and end wall 23 is at atmospheric pressure. This is the brake-applying position of piston 19 because in this position it pulls on both cables 12 and 13 to apply the respective brakes.

Figure 3:
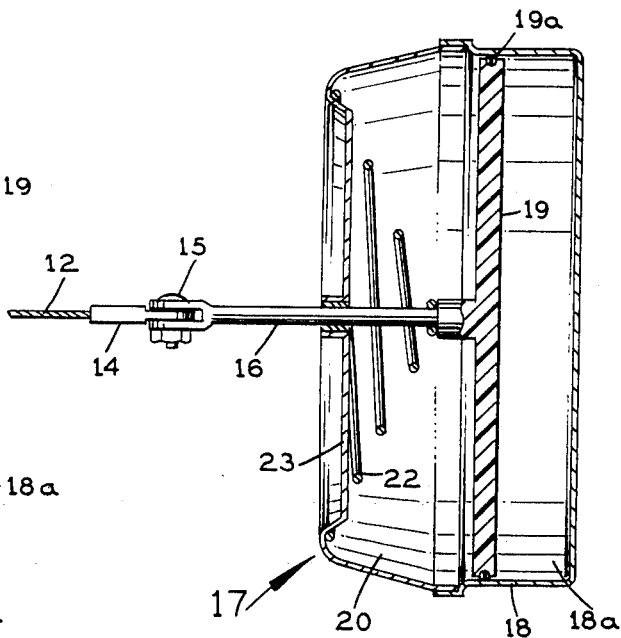
FIG. 3 is a similar view of the actuator in its brake-releasing position.

As shown in FIG. 3, when chamber 20 is under a substantial partial vacuum the piston 19 will be displaced to the left. This is the brake-releasing position of piston 19 because in this position it relaxes cables 12 and 13 to release the corresponding brakes.

Conduit 21 has one end in fluid communication with the cylinder chamber 20 and its opposite end in fluid communication with one port 25 of a three-way solenoid valve 26 of known design. A suitable valve 26, by way of example only, is a three way normally open DC type C5 valve available from Skinner Valve, a Honeywell Division. A second port 27 of the solenoid valve is connected through a pressure-responsive one-way, check valve 28 to the manifold 24 of the vehicle engine. The solenoid valve 26 has a third port at 29 which is open to the atmosphere.

Check valve 28 preferably has a spring-biased ball or diaphragm which is biased to a seated position. When a substantial partial vacuum is established in the engine manifold, this causes check valve 28 to open fully. When the engine manifold pressure is at substantially atmospheric pressure, the check valve 28 seats in its nominal closed position but in this position there is enough leakage through the check valve that after a time delay, on the order of 1 to 5 seconds, the pressure in conduit 21 to the left of this check valve in FIG. 1 will be substantially atmospheric pressure. A suitable check valve, by way of example only, is a type 2-1015 check valve available from The Echlin Manufacturing Co. of Branford, Conn.

An operating coil (not shown) of the solenoid valve is connected by wires 30 and 31 through a time delay circuit 32 of known design to a seat switch 33, also of known design. This seat switch is connected between the vehicle battery (not shown) and the solenoid valve coil to energize the coil as long as the seat switch 33 is closed. The seat switch is in the driver's seat and it remains closed due to the driver's weight as long as the driver is sitting on the driver's seat. When the driver leaves this seat, the seat switch opens and after a time delay of 2 or 3 seconds, for example, as determined by the time delay circuit 32, the previously energized solenoid valve coil becomes de-energized.

The lines 30 and/or 31 may include switches or actuators for any or all of the predetermined conditions mentioned previously.

As long as the solenoid valve coil is energized, the solenoid valve is in a first position in which its ports 25 and 27 are connected to each other, and port 29 is blocked from both of them. In this first position the solenoid valve 26 connects the actuator chamber 20 to check valve 28. This condition prevails as long as the driver is in the driver's seat, keeping seat switch 33 closed. Consequently, the pressure in actuator chamber 20 will be determined by the pressure in the vehicle engine's intake manifold, i.e., a substantial partial vacuum when the engine is on and atmospheric pressure after the engine is turned off (after a time delay determined by the leakage through the nominally closed check valve 28).

If the driver leaves the driver's seat with the engine running, after a 2 or 3 second time delay established by the time delay circuit 32, the solenoid valve coil will deenergized and the solenoid valve will connect its atmospheric port 29 to the port 25 leading to the actuator chamber 20 and will block the other solenoid valve port 27 from both of them.

As long as the driver is in the driver's seat, keeping seat switch 33 closed, and the vehicle engine is running, the solenoid valve 26 and the check valve 28 will be fully open to apply the substantial partial vacuum prevailing in the engine intake manifold to the actuator chamber 20. Consequently, the actuator piston 19 will be in the position shown in FIG. 3 and the parking or emergency brakes will be released.

If the driver shuts off the engine while remaining in the driver's seat, the pressure in the engine intake manifold 24 will rise to substantially atmospheric pressure, permitting check valve 28 to seat in its nominal closed position. However, there is enough leakage of air through this closed check valve that after a time interval, such as 1 to 5 seconds, the pressure in actuator chamber 20 will have increased to substantially atmospheric pressure also. Thus causes the actuator piston 19 to move the position shown in FIG. 2, pulling on the brake cables 12 and 13 to apply the brakes.

The flow restriction provided by the closed check valve 28 during the short time interval (e.g., 1 sec. to 5 sec.) will prevent these brakes from being applied immediately if the engine stalls in traffic and the driver re-starts it during this time interval.

If the driver leaves the driver's seat while the engine is running, seat switch 33 will open and, after a time delay determined by the delay circuit 32, will de-energize the solenoid valve coil so that atmospheric pressure will be applied via the solenoid valve ports 29 and 25 and conduit 21 to the actuator chamber 20. Consequently, the actuator piston 19 will move to the brake-applying position shown in FIG. 2.

The time delay circuit 32 prevents the immediate application of the emergency or parking brakes if the driver shifts his position on the driver's seat in such a manner as to open the seat switch 33 momentarily. Only if the seat switch remains open for 2 or 3 seconds will it be effective to apply these brakes.

Figure 4:
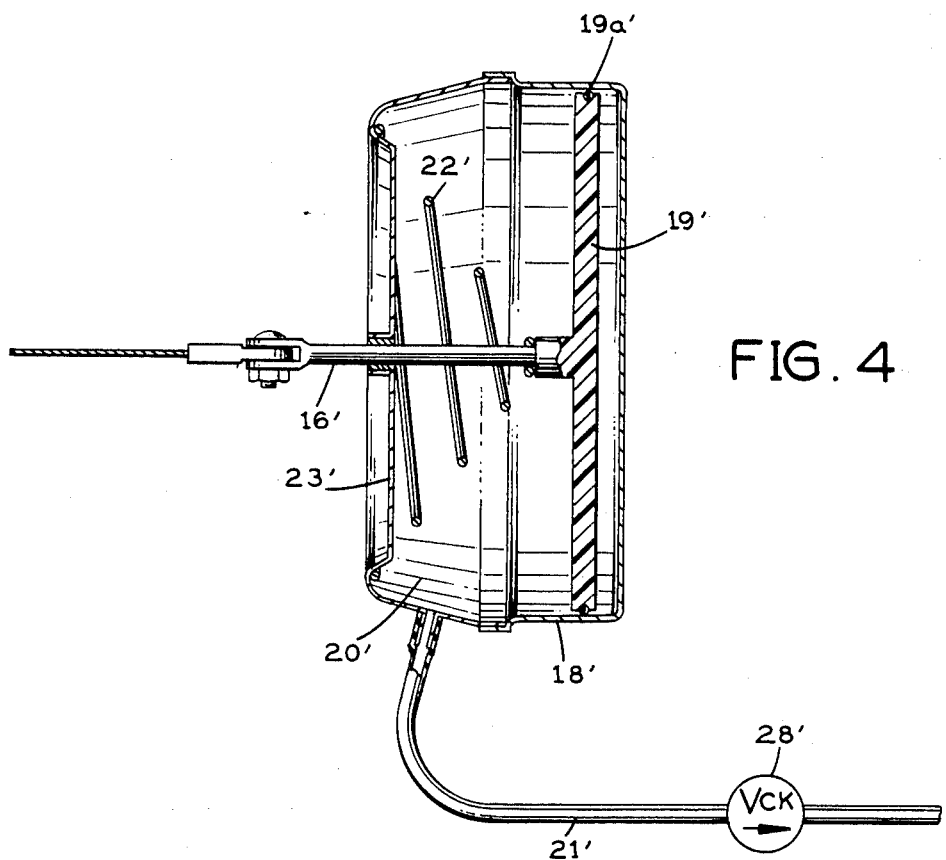
FIG. 4 is a fragmentary schematic diagram of a second, simpler braking system in accordance with this invention.

FIG. 4 shows a simplified version of the present system which omits the solenoid valve 26 and the seat switch 33 of the FIG. 1 system. The FIG. 4 system is solely under the control of the engine intake manifold pressure. Elements of the FIG. 4 system are given the same reference numerals, with a "prime" suffix added, as those in FIGS. 1–3, and need not be described in detail again.

In FIG. 4, as long as the vehicle engine is running and there is a substantial partial vacuum in the engine intake manifold, the actuator chamber 20' will be under this substantial partial vacuum and the actuator piston 19' will be positioned to the left, relaxing the brake cables so that the parking or emergency brakes are off. When the driver turns off the engine, after a brief time delay determined by the leakage rate through the closed check valve 28', the actuator chamber 20' will be at substantially atmospheric pressure and spring 22' will move piston 19' to the position shown in FIG. 4, in which it pulls on the brake cables and applies the brakes.

FIGS. 5 and 6 show a suitable seat switch 49 for either or both of the systems of FIGS. 1 and 4. A resilient, compressible apertured separator 50 separates two contact sheets 52 and 54 in which conductive contacts 56 and 58 are mounted on and electrically connected in common by metal wire mesh 60 and 62. This assembly is enclosed by two sheets of double-sided adhesive tape 64 and 66. Lead wires 68 and 70 are connected to the contact sheets.

In FIGS. 7 and 8, the separator 50 and the contact sheets 52 and 54 are identical to FIGS. 5 and 6. Foam pads 72 and 74 are provided on the upper and lower sides of the contact sheets, and the assembly is enclosed in a vinyl, apertured envelope. In both switches, the contacts 56 and 58 close through the apertures in the separator 50 when a person sits on the seat in which the switch is installed. The separator compresses under the weight of the person to allow the contacts to close.

I claim:

1. In a vehicle braking system for an automotive vehicle having an engine with an intake manifold that is under partial vacuum when the engine is running and substantially at atmospheric pressure when the engine is off, said braking system comprising:
    a brake actuator having a movable pressure-responsive member therein and having a variable-volume chamber on one side of said pressure-responsive member;
    linkage means operatively connecting said pressure-responsive member to a vehicle brake to apply and release the latter in accordance with the position of said pressure-responsive member in said actuator;
    spring means in said actuator biasing said pressure-responsive member to a brake-applying position;
    a fluid conduit connecting said chamber to the engine manifold to apply a substantial partial vacuum to said chamber for moving said pressure-responsive member against the bias of said spring means to a brake-releasing position when the engine is running;
    and a pressure-responsive valve in said conduit which is operable to open automatically to connect said actuator chamber to the engine manifold in response to a substantial partial vacuum in said manifold, said valve being operable to provide restricted fluid communication between the engine manifold and said actuator chamber to apply atmospheric pressure to said actuator chamber after a time delay.

2. A braking system according to claim 1 wherein said valve is a one-way check valve which opens fully in response to the establishment of a substantial partial vacuum in the engine manifold and which seats in response to the establishment of atmospheric pressure in the engine manifold but with enough leakage to provide said restricted fluid communication.

3. A braking system according to claim 2, and further comprising
    a three-way solenoid valve having a first port connected to said actuator chamber, a second port connected to said check valve, and a third port connected to the atmosphere, said solenoid valve having a first operating position in which it connects said first port to said second port and blocks said third port from both said first and second ports, said solenoid valve having a second operating position in which it connects said first port to said third port and blocks said second port from both said first and third ports;
    and a switch shiftable between first and second conditions and operatively connected to said solenoid valve for causing the latter (1) to assume its first position while the switch is in its first condition and (2) to assume its second position while the switch is in its second condition.

4. A braking system according to claim 3, and further comprising:
    a time delay circuit operatively connected between said switch and said solenoid valve to delay the movement of the solenoid valve from its first position to its second position in response to shifting of the switch from its first condition to its second condition.

5. A braking system according to claim 1, and further comprising:
    a three-way solenoid valve having a first port connected to said actuator chamber, a second port connected to said pressure-responsive valve, and a third port connected to the atmosphere, said solenoid valve having a first operating position in which it connects said first port to said second port and blocks said third port from both said first and second ports, said solenoid valve having a second operating position in which it connects said first port to said third port and blocks said second port from both said first and third ports;
    and a switch shiftable between first and second conditions and operatively connected to said solenoid valve for causing the latter (1) to assume its first position while the switch is in its first condition, and (2) to assume its second position while the switch is in its second condition.

6. A braking system according to claim 5, and further comprising:
    a time delay circuit operatively connected between said switch and said solenoid valve to delay the movement of the solenoid valve from its first position to its second position in response to shifting of the switch from its first condition to its second condition.

* * * * *